J. B. HOOBER.
CULTIVATOR.
APPLICATION FILED MAY 6, 1909.
968,054.
Patented Aug. 23, 1910.
2 SHEETS—SHEET 1.
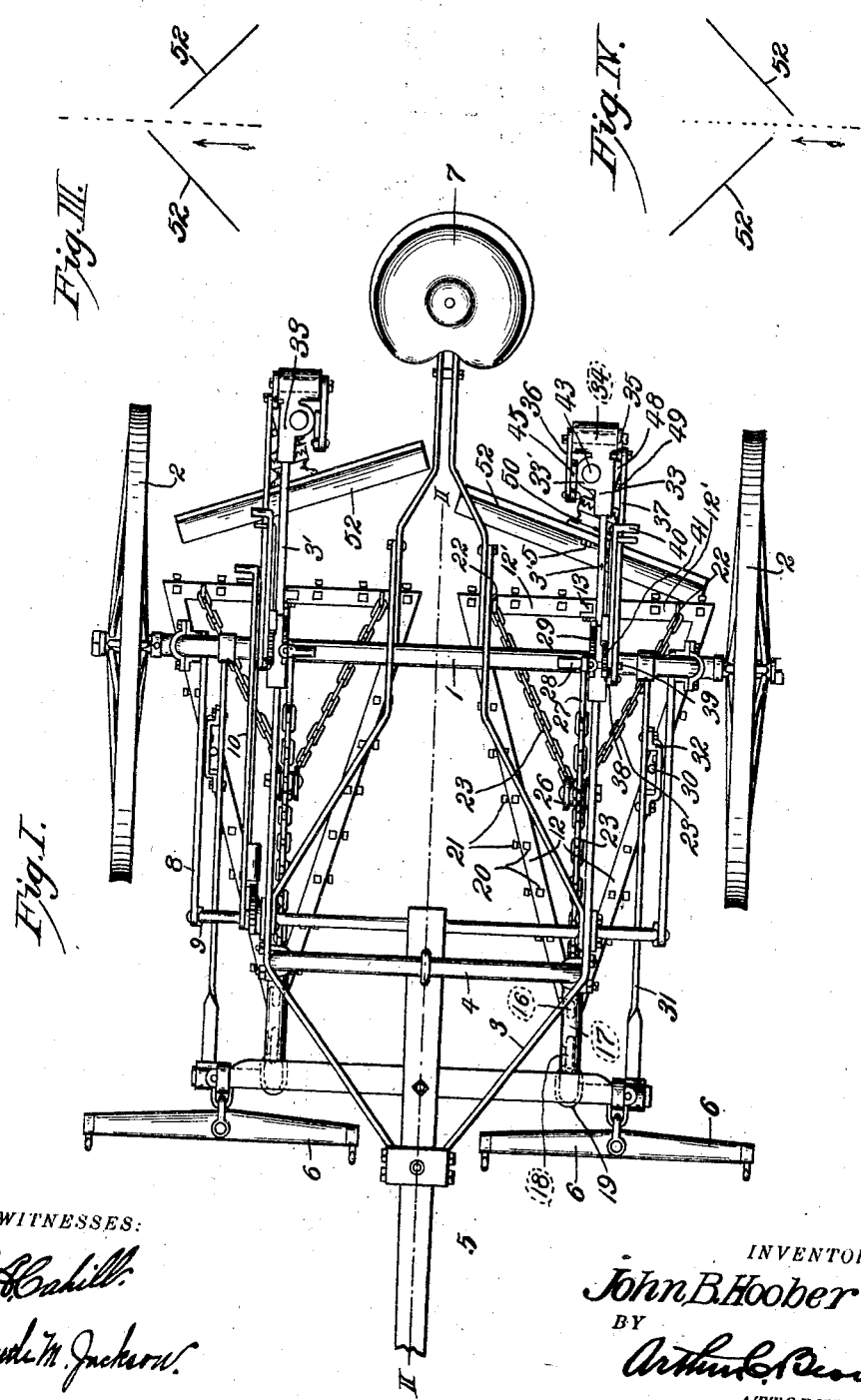
WITNESSES:
E. H. Cahill.
Myrtle M. Jackson.
INVENTOR.
John B. Hoober
BY
Arthur C. Brown
ATTORNEY.

J. B. HOOBER.
CULTIVATOR.
APPLICATION FILED MAY 6, 1909.
968,054.
Patented Aug. 23, 1910.
2 SHEETS—SHEET 2.
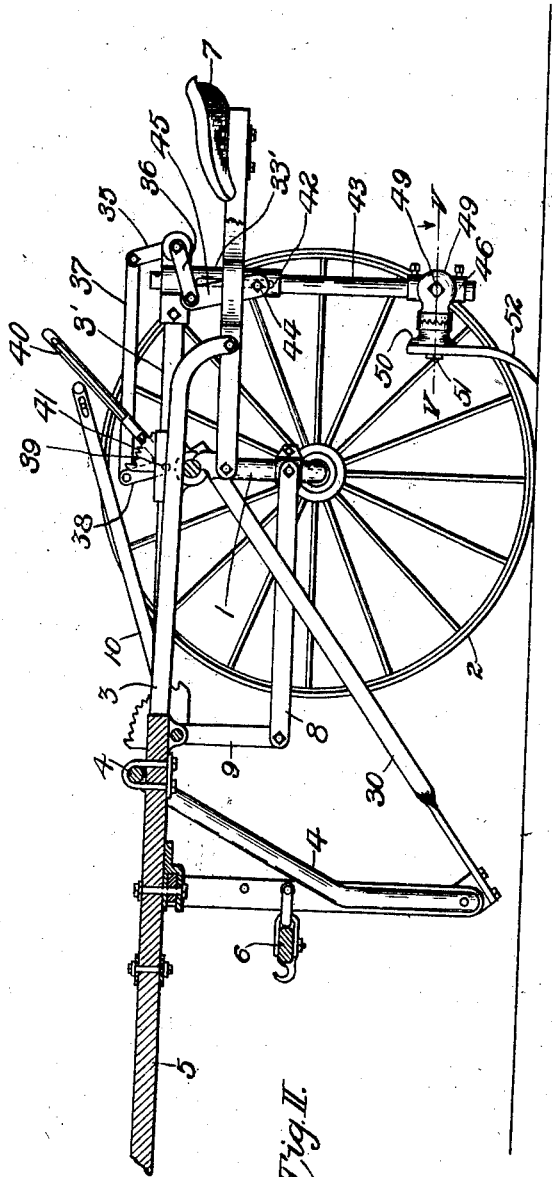
WITNESSES:
INVENTOR.
John B. Hoober.
BY
ATTORNEY.

UNITED STATES PATENT OFFICE.

JOHN B. HOOBER, OF KANSAS CITY, MISSOURI.

CULTIVATOR.

968,054.  Specification of Letters Patent.  Patented Aug. 23, 1910.

Application filed May 6, 1909. Serial No. 494,494.

*To all whom it may concern:*

Be it known that I, JOHN B. HOOBER, a citizen of the United States, residing at Kansas City, in the county of Jackson and State of Missouri, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to riding cultivators.

One object of my invention is to provide a cultivator by the use of which the field may be cultivated earlier, and deeper, than is possible with shovel cultivators.

A further object is to provide automatic means carried by the cultivator whereby, the first time over the field when the plants are small, all weeds and clods will be cleaned away, and whereby, later on when the plants have reached a larger growth, fresh earth will be thrown up around the stalks, giving the twofold benefit of nourishing the stalks and smothering the weeds.

These objects are attained by certain constructions herein described and claimed, and illustrated in the accompanying drawings, in which:—

Figure I is a plan view of a wheeled cultivator constructed according to my invention. Fig. II is partly a side elevation and partly a vertical section taken on line II—II of Fig. I. Figs. III and IV indicate, diagrammatically, the proper positions for the scrapers for first and second cultivations. Fig. V is a sectional detail view of one of the scraper mountings, viewed on the line IV—IV of Fig. II. Fig. VI is a rear detail view of said mounting.

Referring more in detail to the parts:—The frame of the cultivator comprises the arched axle 1, the wheels 2, forwardly extending converging bars 3, a forward arch 4 secured to said bars 3, and the tongue 5. It is provided with whiffletrees 6 for harness attachment, and with the driver's seat 7.

8 and 9 are links connected to the wheel axle for turning same, and 10 is a hand lever for operating said links. The parts just referred to are not features of my invention, therefore they require no detailed description. But the general type of frame shown in the drawing is especially adapted for my improvements to be described.

The wheeled frame is adapted to carry harrowing or cultivating devices, not shown in detail and rearwardly of such devices the following construction is provided. The frame bars 3 extend rearwardly as shown at 3', and carry, on their ends, castings 33. Journaled in each casting is a horizontal rock-shaft 34, having fixed upon its respective ends two lever arms 35, 36. One arm, 35, is connected by a rod 37 with a parallel arm 38, fulcrumed on a stud 39. Integral with rock-arm 38 is a hand lever 40, having a latch engaging a notched sector 41. Casting 33 is formed with a depending sleeve 33', in which is a vertical slot 42. Slidably passing through said sleeve is a bar 43, having a stud bolt 44 projecting loosely through slot 42. A link 45 connects pivotally the stud 44 to lever arm 36. Thus when the hand lever 40 is latched the bar 43 is held up at the desired height. Mounted on said bar is a casting 46, secured thereon by set-screws 47. This casting carries a casting 48, secured thereto by a screw stud 49 which, when loosened, forms a pivot about which the piece 48 may be turned. The contacting surfaces of the pieces are corrugated so that they interlock as shown at *d* on Fig. VI. Piece 48 carries a third piece 50, secured thereto by a screw stud 51, concentric with which the two pieces have interlocking surfaces. One piece may also project into the other, as shown. The screw 51 serves also to hold in position a scraper blade, 52, as shown in detail in Fig. IV. The scraper or blade 52 stands vertical at its upper part, but curves forwardly toward its lower edge. The two motions possible by adjusting parts 50 and 48 on the screws 51 and 49, render the blade or scraper adjustable in two planes at right angles to each other.

The construction above described in connection with one scraper is duplicated on the other side of the cultivator, but, as shown in Fig. I, one of the blades or scrapers is set in advance of the other. This arrangement I have found better in practice in the matter of covering up weeds and forming the ridge of earth.

The operation of this cultivator is substantially as follows:—Two draft animals are hitched to the swingletrees 6 and if the plants are very young, the operator sets the teeth 20 low and lets down the chains 23. He also sets the blades or scrapers 52 at about the angles indicated by the lines in Fig. V, the direction of motion being indicated by the arrow. As the cultivator moves forward the blades 52 clean away all weeds, rubbish and clods from the row. This is very desirable, as crop raisers will readily apprehend. Before cultivating the field a second time, the teeth 20 should be raised somewhat, and the blades or scrapers 52 should be turned around to about the angles represented by the lines in Fig. VI. The blades will then operate to draw the surface earth inward and deposit it about the bases of the stalks, at the same time covering up and killing all weeds and grass. The angle at which the scrapers are set upon their pivots 51 should be governed by the height of the rows, as will be readily understood.

Having thus described my invention, what I claim as new therein and desire to secure by Letters-Patent is:—

1. In a cultivator, the combination of a rigidly supported standard, a casting vertically adjustable thereon and provided with a pivot stud disposed horizontally and transversely of the cultivator, a casting mounted on said pivot-stud and provided with a pivot-stud disposed horizontally and at a right angle to the first named pivot stud, and a scraper blade secured to the last named casting by the last named pivot stud, substantially as described.

2. In a cultivator, the combination of a rigidly supported standard, a casting vertically adjustable thereon and provided with a pivot stud disposed horizontally and transversely of the cultivator, a casting mounted on said pivot stud and provided with a pivot stud disposed horizontally and at a right angle to the first named pivot stud, and a scraper blade secured to the last named casting by the last named pivot stud, the engaging faces of the said three castings being radially corrugated.

In testimony whereof I affix my signature in presence of two witnesses.

JOHN B. HOOBER.

Witnesses:
MYRTLE M. JACKSON,
E. A. CAHILL.